(12) United States Patent
Hammer

(10) Patent No.: US 10,737,562 B2
(45) Date of Patent: Aug. 11, 2020

(54) VEHICLE ROOF COVER

(71) Applicant: WEBASTO SE, Stockdorf (DE)

(72) Inventor: Jan Hammer, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/077,923

(22) PCT Filed: Feb. 6, 2017

(86) PCT No.: PCT/EP2017/052562
§ 371 (c)(1),
(2) Date: Aug. 14, 2018

(87) PCT Pub. No.: WO2017/140524
PCT Pub. Date: Aug. 24, 2017

(65) Prior Publication Data
US 2019/0047388 A1    Feb. 14, 2019

(30) Foreign Application Priority Data

Feb. 15, 2016    (DE) .................... 10 2016 001 629

(51) Int. Cl.
| | | |
|---|---|---|
| *B60J 7/00* | (2006.01) | |
| *B60Q 3/64* | (2017.01) | |
| *B60Q 3/208* | (2017.01) | |
| *B60J 7/02* | (2006.01) | |
| *B62D 65/06* | (2006.01) | |

(52) U.S. Cl.
CPC ............. *B60J 7/022* (2013.01); *B60Q 3/208* (2017.02); *B60Q 3/64* (2017.02); *B62D 65/06* (2013.01)

(58) Field of Classification Search
CPC ..... B60J 7/02; B60J 7/022; B60J 7/00; B60Q 3/62; B60Q 3/208; B60Q 3/64

USPC .......................................................... 296/211
See application file for complete search history.

(56) References Cited

U.S. PATENT DOCUMENTS

| | | |
|---|---|---|
| 6,338,526 B1 | 1/2002 | Jardin et al. |
| 8,829,539 B2 | 9/2014 | Kleo et al. |
| 2014/0204601 A1 | 7/2014 | Bäuerle et al. |

(Continued)

FOREIGN PATENT DOCUMENTS

| | | |
|---|---|---|
| DE | 11 24 528 C1 | 7/1992 |
| DE | 19942038 C1 | 10/2000 |
| DE | 10 2004 007 555 A1 | 9/2005 |

(Continued)

OTHER PUBLICATIONS

Notification Concerning Transmittal of International Preliminary Report on Patentability (Chapter I of the Patent Cooperation Treaty) against PCT/EP2017/052562 dated Aug. 30, 2018.

(Continued)

*Primary Examiner* — Dennis H Pedder
(74) *Attorney, Agent, or Firm* — Fitch, Even, Tabin & Flannery, LLP

(57) ABSTRACT

A cover of a vehicle roof, which has a glass panel, a cover frame arranged on the inside of the cover or glass panel and components arranged on the inside of the cover, in particular functional components and/or lighting components of a cover lighting device, wherein, according to one approach, the cover frame or blind forms an assembly unit that bears the components and that is fastened to the inside of the cover by a plastic foaming, by an adhesive or by mechanical connections and with correct positioning of the components on the cover.

5 Claims, 4 Drawing Sheets

(56) References Cited

U.S. PATENT DOCUMENTS

2014/0362597 A1    12/2014    Verrat-Debailleul et al.

FOREIGN PATENT DOCUMENTS

| DE | 102012109900 A1 | 4/2014 |
| DE | 10 2015 000 071 A1 | 7/2016 |
| DE | 10 2015 102 616 B3 | 7/2016 |
| EP | 1 080 962 A2 | 3/2001 |
| EP | 1 080 962 A3 | 2/2002 |
| EP | 2 528 776 A1 | 12/2012 |

OTHER PUBLICATIONS

Notification of Transmittal of Translation of the International Preliminary Report on Patentability (Chapter I or Chapter II) against PCT/EP2017/052562 dated Aug. 30, 2018.
International Search Report issued against German Application No. DE 10 2016 001 629.9 dated Dec. 12, 2016.
International Search Report for PCT/EP2017/052562 dated May 19, 2017 and English translation submitted herewith (5 Pages).

VEHICLE ROOF COVER

CROSS-REFERENCE TO RELATED APPLICATIONS

This application is a U.S. national phase application filed under 35 U.S.C. § 371 of International Application No. PCT/EP2017/052562, filed Feb. 6, 2017, designating the United States, which claims priority from German Patent Application No. 10 2016 001 629.9, filed Feb. 15, 2016, which are hereby incorporated herein by reference in their entirety for all purposes.

FIELD

The invention relates to a cover for a vehicle roof having a glass panel, a cover frame arranged on the inside of the cover or glass panel, and components arranged on the inside of the cover, in particular functional components and/or lighting components of a cover lighting device, as well as a method for producing a vehicle roof cover.

BACKGROUND

DE 199 42 038 C1 discloses a vehicle roof cover, which is formed, e.g., by a glass panel, and which has a cover frame mounted on the inside of the cover by means of plastic foaming. Heating elements, heating wires or aerial wires are embedded in the plastic foaming and can be attached to the cover frame before mounting to the cover by means of plastic foaming. Attachment is done by gluing at the cover frame or by a plug receptacle, which receptacle is a plastic profile shape and attachable to the cover frame.

DE 10 2012 109 900 A1 discloses a vehicle roof cover having a glass panel and a photoconductive layer cohesively bonded to the inside of the glass panel by means of a bonding layer, whereby a light source may irradiate light into the end face of said photoconductive layer. The light source is attached to the inside of the glass panel.

SUMMARY

The object of the invention is to provide a cover, as mentioned above, which is improved by simplifying its production, and to provide an improved method for producing a vehicle roof cover.

This object is achieved according to the invention with regard to the cover mentioned above in that the cover frame or a blind forms an assembly unit carrying the components, and which is attached to the inside of the cover by plastic foaming, gluing or mechanical connections, and attached to the cover, upon correct positioning of the components.

Advantageous embodiments of the invention are specified in the dependent claims.

With the cover according to the invention, the pre-assembly of all individual parts or components, which previously were to be attached individually to the cover itself, may be done on the cover frame or the blind. Thus, the cover frame or the blind each form an assembly unit carrying the components and is placed in a die and there connected to the glass panel(s) of the cover by foaming or foam coating. Alternatively, the blind is attached as an assembly unit provided with components to the cover or the cover frame mounted on the cover, e.g., by means of bonding or mechanical connections. Thus, final assembly of the cover is simplified and accelerated. Moreover, the components placed in the assembly unit, such as electronic or lighting components, may be checked for proper functioning prior to final assembly.

The cover frame may be, e.g., an inner cover sheet attached to the inside of the cover by foaming or foam coating.

Thus, in a preferred embodiment, the cover frame forms a mounting support upon which the blind is placed as an assembly unit. Thus, the in particular integrally formed blind may be attached to the cover frame by means of mechanical connections in the form of latching hooks, snap hooks or expansion clips, which engage, e.g., in openings or holes in the cover frame. Alternatively, the mechanical connections or the latching hooks, snap hooks or expansion clips or other mechanical parts may be used in linear guides on the cover frame and displaced in a linear sliding movement of the blind into a locking position.

The cover frame is conveniently attached to the inside of the cover by means of foaming or foam coating, whereby at least the connection points are formed without foaming for mechanical connection to the blind.

In a preferred embodiment, the blind has a lighting device with at least one LED module comprising a light guide and a cable or wiring harness for electrical connection of the LED module to a contact module on the cover or cover frame, and which provides a power supply via the cover frame.

Furthermore, a preferred embodiment may provide that the cover frame, as the assembly unit supporting the components, be attached to the inside of the cover by means of foaming or foam coating, that the components comprise at least one light guide, which irradiates light into a cover plate and in particular irradiate a structure on the cover plate, and that in particular the foaming or foam coating may cover the light guide in a blind-like fashion. In this embodiment, the foaming or foam coating may form a blind-like cover on the visible side, which may also prevent stray light from the light guide to the inside of the cover or the vehicle interior.

The cover may be formed such that it has an outer glass panel and an inner glass panel connected to the outer glass panel, in particular by means of a hot-melt film adhesive, that the cover frame is mounted on the inside of the outer glass panel with foaming or foam coating, and that the light guide is arranged for radiating light in an end face at the rim of the inner glass panel.

The inner glass panel appropriately contains a structure that emerges visually, when light is being irradiated into the inner glass panel. The structure is produced, e.g., by screen printing or imprinting the inner glass panel. The structure may represent, e.g., a pattern, an emblem or a font, or combinations thereof.

The method according to the invention for producing a vehicle roof cover, in particular a cover according to one of claims 1 to 5, provides that the components, in particular the functional components and/or lighting components of a cover lighting device, be mounted on a cover frame or a blind, and that either the cover frame forming a prefabricated assembly unit on the inside of the cover be attached by means of plastic foaming, e.g., polyurethane foam, or the blind forming a prefabricated assembly be attached by means of bonding or by in particular detachable mechanical connections to the cover or a cover frame arranged on the cover.

BRIEF DESCRIPTIONS OF THE DRAWING

The invention will be explained in more detail below based on exemplary embodiments of a cover according to the invention and with reference to the drawing. The following is shown:

DETAILED DESCRIPTION

Figure 1:
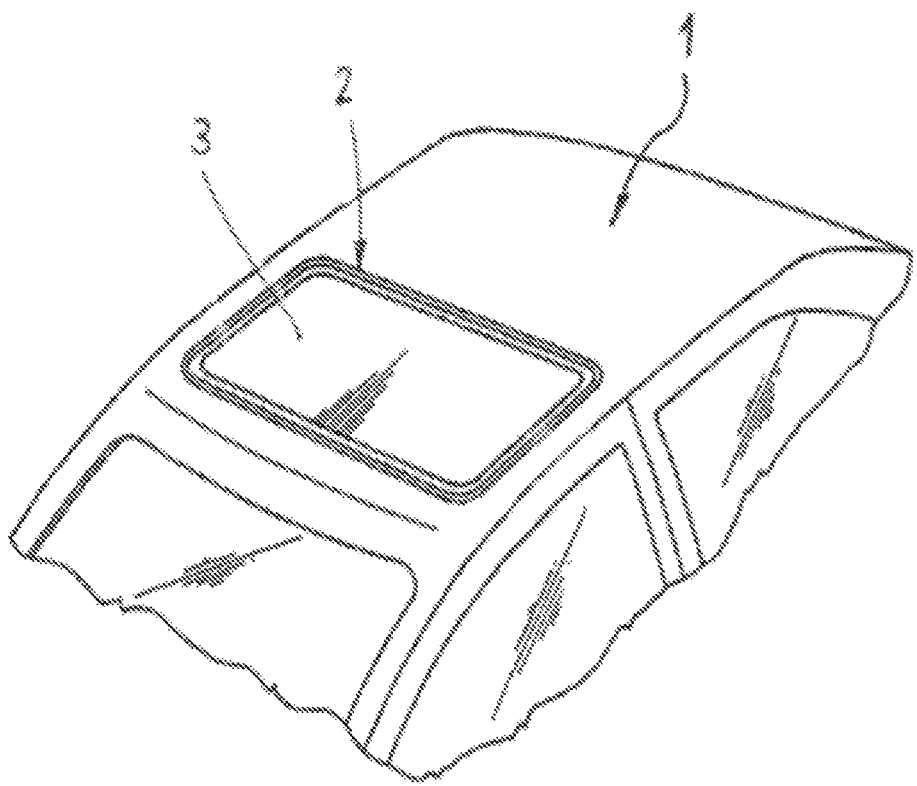
FIG. 1 is an isometric view of a vehicle roof with a cover according to the invention in a roof opening.

A vehicle, such as a passenger vehicle, comprises a vehicle roof 1 (FIG. 1) with a roof opening 2, in which a cover 3 is arranged. The cover 3 is fixedly arranged in the roof opening 2 or movably supported by a bearing device and is adjustable between a closed position and ventilation or opening positions in a conventional manner.

The cover 3 includes an outer glass panel 4 (see FIG. 2), which is formed, e.g., as a single-pane safety glass, and an inner glass panel 5, which is, e.g., a clear glass pane and glued by means of a hot-melt adhesive film 32 (PVB, EVA, TPU) flatly to the inside 6 of the outer glass panel 4. The inner glass panel 5 is of a size or area that is smaller than the outer glass panel 4 and is arranged on the outer glass panel 4, such that it substantially covers a central portion of the outer glass panel 4, and on at least two opposite rims 7 of the outer glass panel 4 and inwardly from the respective rim 7, an exposed strip-shaped surface 8 remains on the inside 6 of the outer glass panel 4. Such an exposed surface 8 may also be provided circumferentially on all four rims 7. A cover frame 9, e.g., as an inner cover sheet of the cover and forming a frame-like reinforcement of the cover 3, represents an assembly unit made of polyurethane plastic and is attached to the inside 6 of the outer glass panel 4 by means of foaming or foam coating 10. The cover frame 9 has a cross-sectionally U-shaped profile with an inner leg 11 resting against the inside 6 of the outer glass panel 4 and an angled outer leg 12, which also rests with an outwardly projecting abutment web 13 against the inside 6 of the outer glass panel 4. On the inwardly facing side 14 of the inner leg 11, a support member 15 is attached, e.g., by gluing. The support member 15 supports a light guide 16 at the end face 17 of the rim 18 of the inner glass panel 5 positioned such that light emitted by the light guide 16 is irradiated into the inner glass panel 5. On its inner surface 19 facing the outer glass panel 4, the inner glass panel 5 has a pattern 20, which is clearly visible from the underside of the cover 3 (from above according to FIG. 2), or from the vehicle interior due to the incident light. The pattern 20 is formed, e.g., as an imprint on the inner glass panel 5.

Moreover, a wiring harness 21 is attached to the abutment web 13 of the outer leg 12 of the cover frame 9 by means of mounting elements 22, which are inserted, e.g., in holes 23 in the abutment web 13 of the outer leg 12. The wiring harness 21 forms a power supply between a contact unit (not shown), via which power is provided from a power supply on the vehicle roof side to an LED module (not shown), which is connected to the light guide 16 and generates light, which is irradiated via the elongated light guide 16 and the end face 17 of the inner glass panel 5 into the inner glass panel 5. Thus, the cover frame 9, as an assembly unit, contains the components or lighting components of a cover lighting. The foaming or foam coating 10 of polyurethane plastic encloses the entire cover frame 9 and overlaps the light guide 16 with a rim portion 24 in a blind-like fashion. A narrow gap 26 may be provided between the foaming or foam coating 10 or the rim portion 24 and the inner glass panel 5, and which is formed by a shadow gap sealing 25 shown in FIG. 2 when manufacturing the foaming or foam coating 10. The light guide 16 and/or the LED module may also be foamed directly without the use of support members 15 with or at the foaming or foam coating 10. Similarly, the wiring harness 21 may be foamed directly and without the use of mounting elements 22 with or at the foaming or foam coating 10.

Figure 2:
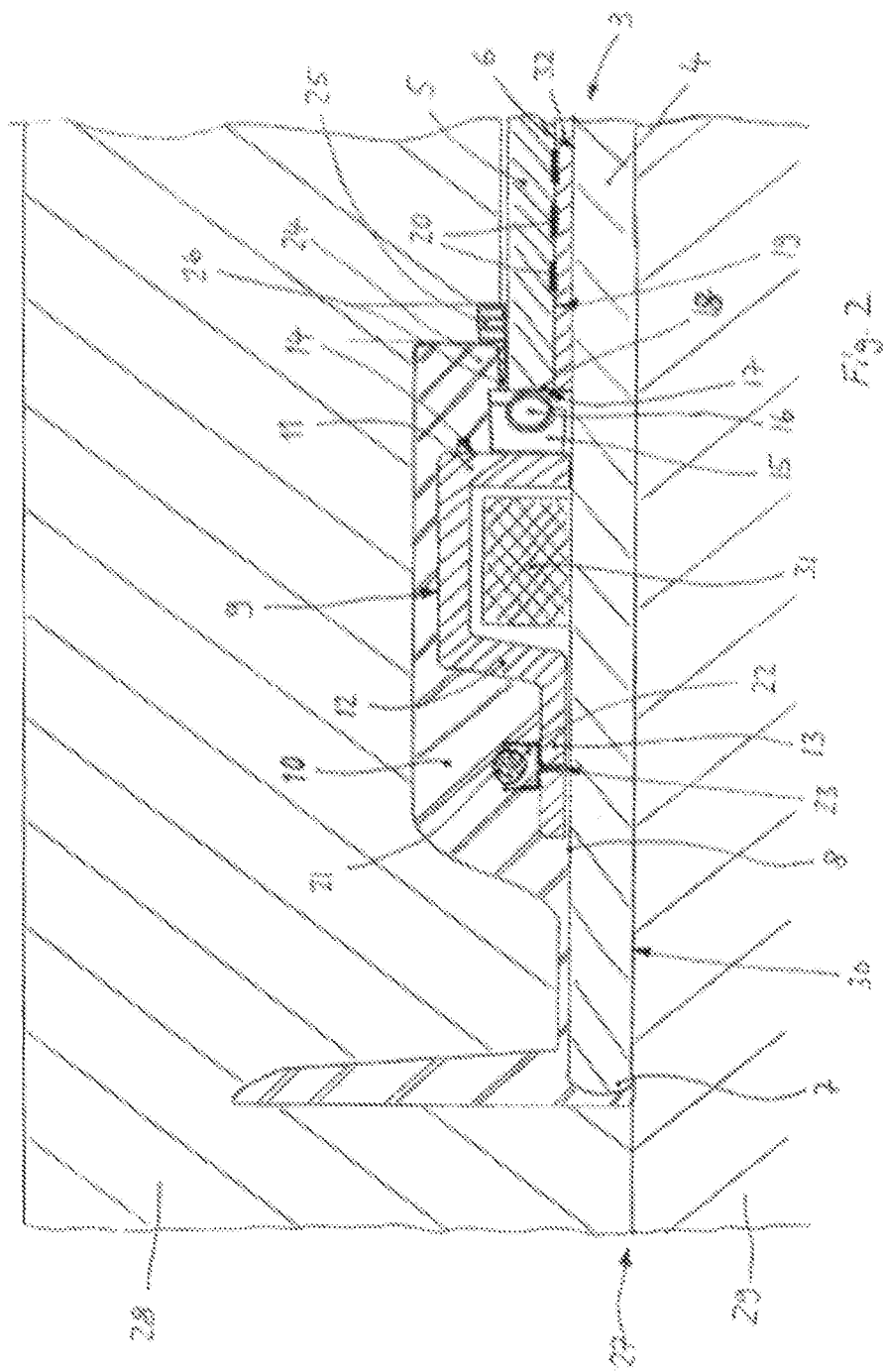
FIG. 2 is a cross-sectional view of a rim area of the cover when being manufactured in a die.

FIG. 2 shows a lateral rim portion of the cover 3 in a die 27, whose halves or upper die 28 and lower die 29 are closed. When manufacturing the cover 3, the cover 3 with the outer side 30 of the outer glass panel 4 is initially placed on the lower die 29, when the die halves 28, 29 are open. Prior to placement in the die 27 as an assembly unit, the cover frame 9 is provided with the associated components, such as light guide 16 and wiring harness 21, whereby the light guide 16 has been inserted into the support members 15 and the support members 15 has been attached, e.g., with clips, tape, glue or screws at the inner leg 11 of the cover frame 9. Furthermore, the wiring harness 21 is inserted into the wiring harness mounting elements 22 and secured by these to the abutment web 13, e.g., with clips, tape, glue, screws or with insertion pins inserted into the holes 23. Further components may be attached to the cover frame 9.

The cover frame 9 with its mounted components is then placed as an assembly unit, with the die 27 open, on the outer glass panel 4 with correct positioning of the light guide 16 relative to the inner glass panel 5 (see FIG. 2), whereby an insert 31 made, e.g., of Styrofoam or EPS, is placed in the groove-shaped space of the U-profile of the cover frame 9, and the shadow gap sealing 25 supported by the upper die 28 rests against the inner glass panel 5. Upon closing the two die halves 28 and 29, the foaming or foam coating 10 is created by injecting PU into the cavity of the upper die 28, which surrounds the cover frame 9 and fixedly attaches it to the inside of the outer glass panel 4. The composite of the fitted cover frame 9 and the outer and inner glass panels 4, 5 is produced in a simple way. After opening the die 27, further processing steps may optionally be undertaken at the cover 3. When removing the cover 3 from the die 27, the shadow gap sealing 25 remains on the die 27.

The cavity for applying the foaming or foam coating 10 may also be provided in the lower die 29, whereby the outer glass panel 4 and the cover frame 9 with its components are correspondingly inserted in the die 27.

Figure 3:
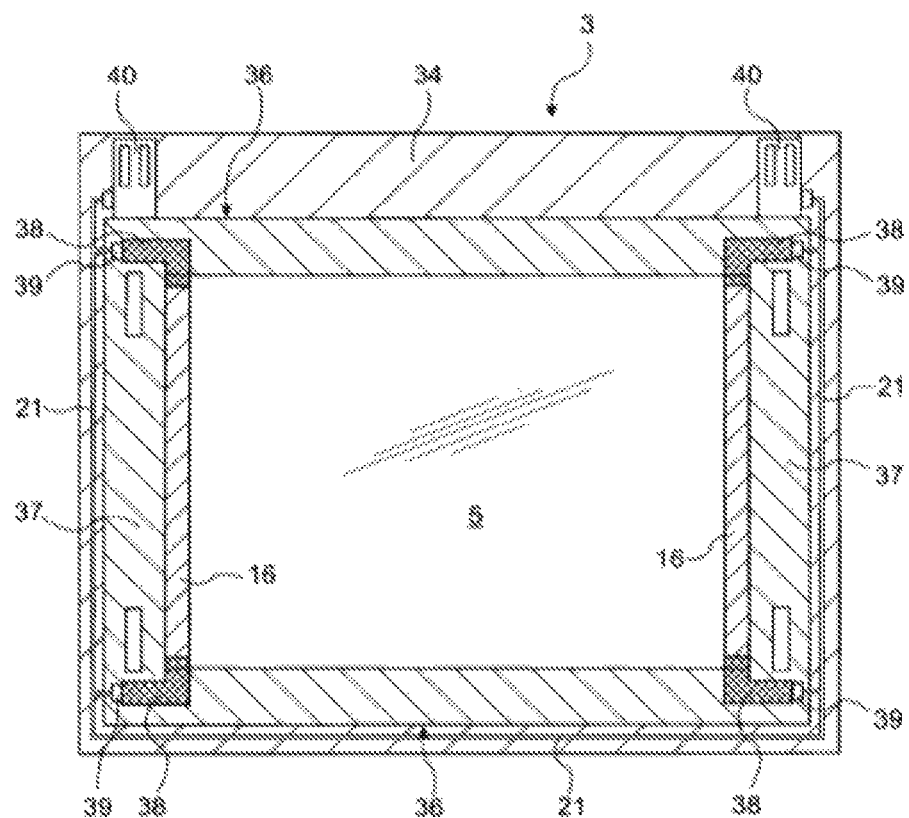
FIG. 3 is a plan view of the underside of a cover with a cover frame and a blind attached thereto as an assembly unit carrying components.

In a further exemplary embodiment (see FIG. 3), the cover 3 contains, e.g., a laminated assembly with an outer glass panel 4 and an inner glass panel 5 according to the first exemplary embodiment. A cover frame 34, e.g., an inner cover plate, is attached to the inside of the outer glass panel 4, e.g., by foaming. The foaming does not fully envelop the cover frame 34, but at least exposes the connection points, at which in particular an integral blind 36 may be connected in particular detachably by means of mechanical connections to the cover frame 34.

Components such as functional components or lighting components of the first exemplary embodiment may be attached to the blind 36. Thus, a light guide 16 and LED modules 38 arranged at both ends may be mounted, e.g., on each of the two lengths 37 of the blind 36, which LED-modules 38 irradiate light into the light guide 16. In addition, light guides 16 on all four sides or a circumferential light guide may be attached to the blind 36, thereby providing at least one LED module 38 for light generation and irradiation. The blind 36 thus represents an assembly unit, which may be provided with components and subsequently mounted on the cover frame 34 forming a mounting support.

Figure 4:
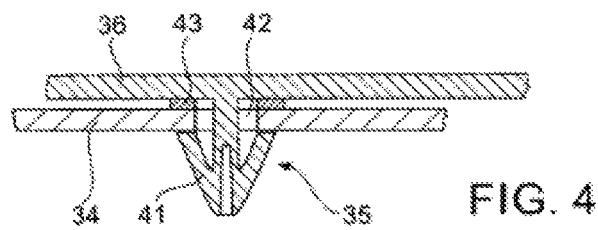
FIG. 4 is a vertical sectional view of a connection point for connecting the blind to the cover frame.

Attachment of the blind 36 to the cover frame 34 may be done using clips 41 or expansion clips (see FIG. 4), which are molded onto the blind 36 or are attachable thereto, and which may be attached to connection points 35 provided at the cover frame 34 and, e.g., which may be inserted into openings 42 of the connection points 35. The blind 36 is thus placed in the correct position on the cover frame 34 and pressed against it, causing the clips 41 to engage. In particular, elastic washers 43 or other elastic elements may be arranged between the blind 36 and the cover frame 34 so as to avoid in particular rattling noises caused by elastic decoupling of the blind 36 from the cover frame 34.

Power supply for the LED modules 38 may occur via at least one wiring harness 21, which is arranged on the cover 3 or on the cover frame 34, and be connected via contacts or plug connectors 39 to the LED modules 38. At least one contact module 40 may be arranged on the cover 3 or the cover frame 34, which is electrically connected to the wiring harness 21, and which may make available a power supply, when contacting a contact device on the vehicle roof side. Alternatively, the wiring harness 21 may be attached to the blind 36, electrically connected to the LED modules 38, and connected to the contact module 40 via a plug connection.

Figure 5:
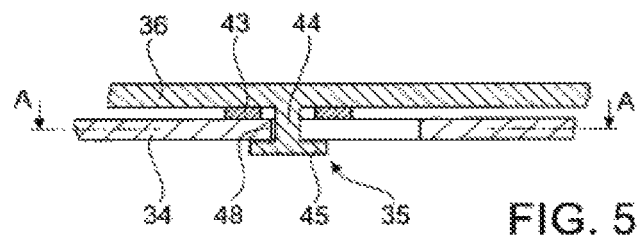
FIG. 5 is a vertical sectional view along the line B-B in FIG. 6 another embodiment of a connection point for connecting the blind to the cover frame.
Figure 6:
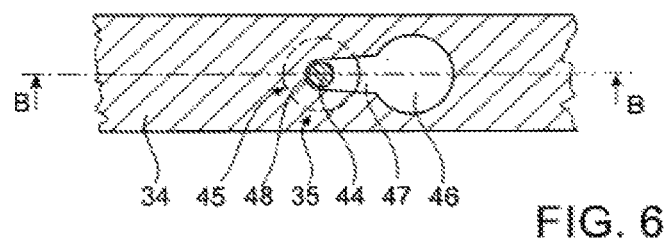
FIG. 6 is a horizontal sectional view along the line A-A in FIG. 5 of the connection point between the blind and the cover frame.

A further type of attachment of the blind 36 on the cover frame 34 may be realized by mechanical fasteners (FIGS. 5 and 6), which have, e.g., a pin 44 protruding from the blind 36, with a mounting head 45, and which may be inserted through associated openings 46 on the cover frame 34. Each of the openings 46 are created at the end of an oblong recess 47 on the cover frame 34. The recess 47 tapers conically beginning from the opening 46 and up to a retaining opening 48. Several parts of this kind with these connection points 35 may be provided, e.g., on two opposing longitudinal sections of the blind 36. When mounting the diaphragm 36 on the cover frame 34, the blind 36 is initially guided against the cover frame 34, such that all mounting heads 45 are inserted through the associated openings 46 on the cover frame 34. Subsequently, the blind 36 is moved lengthwise relative to the cover frame 34, whereby with this linear sliding movement, each pin 44 carrying the mounting head 45 is positioned at the connection point 35 in the retaining opening 48 and in particular held in a clamped or locked fashion. The blind 36 is thus securely held at the cover frame 34, but may be detached again, if it needs to be removed, e.g., for repair purposes. Several fasteners distributed over the circumference of the blind 36 ensure secure clamping of the blind 36 on the cover frame 34 The connecting elements may also be provided in the form of latching hooks, snap hooks or expansion clips, which are slidable in the relevant oblong recess 47. This type of attachment thus allows for disassembly the blind from the cover frame and exchanging the blind in a simple way.

Finally, the blind 36 may furthermore be glued as an assembly unit to the cover frame 34 as a mounting support.

The individual features of the invention disclosed in the specification and based on the exemplary embodiments and the figures may be combined with the inventive subject matter in its general form and in any technically useful arrangements and configurations.

REFERENCE NUMERAL LIST

1 Vehicle roof 25 Shadow gap sealing
2 Roof opening [moonroof] 26 Gap
3 Cover 27 Die
4 Outer glass panel 28 Upper die
5 Inner glass panel 29 Lower die
6 Inside 30 Outside
7 Rim 31 Insert
8 Face 32 Hot-melt adhesive film
9 Cover frame
10 Foaming or foam coating 34 Cover frame
11 Inner leg 35 Connection point
12 Outer leg 36 Blind
13 Abutment web 37 Length
14 Inside 38 LED module
15 Carrier part 39 Plug connector
16 Light guide 40 Contact module
17 Face 41 Clip
18 Rim 42 Opening
19 Inner surface 43 Washer
20 Pattern 44 Pin
21 Wiring harness 45 Mounting head
22 Mounting element 46 Opening
23 Bore 47 Recess
24 Rim portion 48 Retaining opening

The invention claimed is:

1. A vehicle roof cover comprising:
a glass panel,
a cover frame arranged on an inside of the cover or glass panel, and
lighting components of a cover lighting device arranged on the inside of the cover or glass panel,
wherein the cover frame forms an assembly unit carrying the lighting components, which is attached to the inside of the cover, and
wherein the cover frame, as an assembly unit carrying the lighting components, is attached to the inside of the vehicle roof cover by foaming or foam coating and is completely covered by the foaming or foam coating, that the lighting components comprise at least one light guide, which irradiates light into a cover or glass panel, and that the foaming and foam coating covers the light guide in the manner of a blind.

2. The vehicle roof cover according to claim 1, wherein the vehicle roof cover has an outer glass panel and an inner glass panel connected to the outer glass panel, that the cover frame is attached to the inside of the outer glass panel with a foam or foam coating and the light guide for irradiating light is arranged in a peripheral end face of the inner glass panel.

3. The vehicle roof cover according to claim 2, wherein the inner glass panel has a structure, which emerges optically, when the light is irradiated into the inner glass panel.

4. The vehicle roof cover according to claim 2, wherein the outer glass panel and the inner glass panel are connected a hot-melt adhesive film.

5. The vehicle roof cover according to claim 1, wherein the cover frame is a reinforcing cover frame.

* * * * *